Dec. 31, 1963  F. H. WRIGHT  3,116,445
SINGLE PHASE INDUCTION MOTORS AND STARTING
ARRANGEMENT THEREFOR
Filed Oct. 31, 1961  2 Sheets-Sheet 1
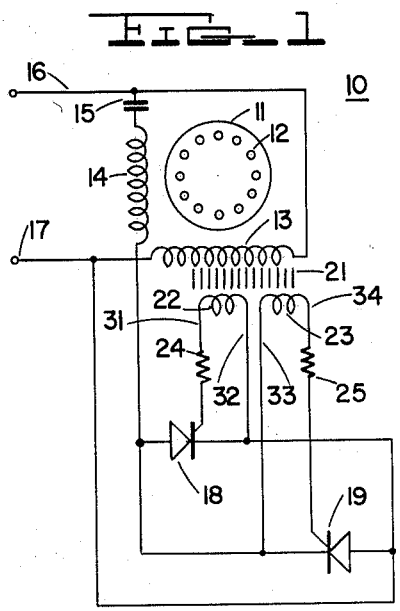
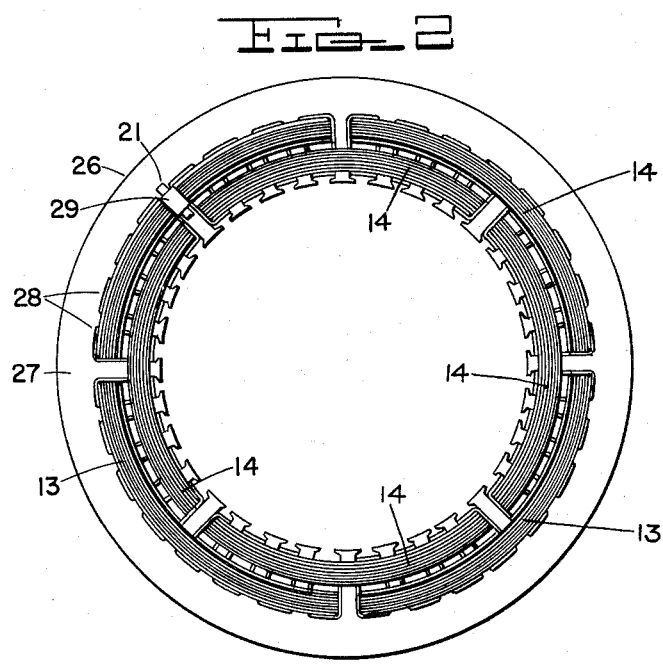
INVENTOR.
Floyd H. Wright,
BY Henry J. Marciniak
Attorney.

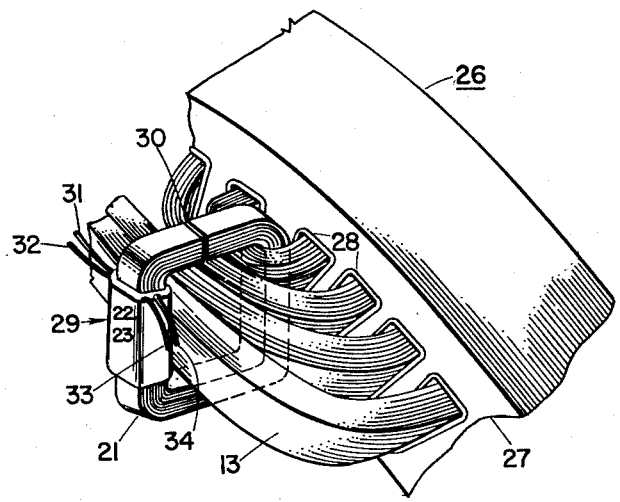

United States Patent Office 3,116,445
Patented Dec. 31, 1963

3,116,445
SINGLE PHASE INDUCTION MOTORS AND
STARTING ARRANGEMENT THEREFOR
Floyd H. Wright, Fort Wayne, Ind., assignor to General
Electric Company, a corporation of New York
Filed Oct. 31, 1961, Ser. No. 149,093
8 Claims. (Cl. 318—220)

This invention relates to the electric motors and more particularly to an improved starting arrangement for single phase induction motors.

It is well known that a single phase induction motor has no torque at standstill and that a phase splitting means must be employed for starting the motor. In a commonly used phase splitting arrangement, a capacitor is connected in series with an auxiliary or starting winding. The starting winding is physically displaced from the main winding, and a rotating magnetic field is produced that is out of phase with the field produced by the main winding and that will consequently cause the rotor of the motor to rotate. After the motor reaches a predetermined speed of rotation, the starting winding and capacitor are usually disconnected by a centrifugal or electromagnetic switching means.

Centrifugal and electromagnetic switching devices employ a number of moving parts and employ electrical contacts to connect and disconnect the phase splitting means from the power supply when the motor reaches its running speed. Excessive wear of electrical contacts and mechanical failure of moving parts of centrifugal and electromagnetic switching devices are frequent causes of motor failures. It would be very desirable, therefore, to provide a motor wherein a starting winding and capacitor, if used, can be disconnected after the motor has reached a predetermined speed without need for conventional switches actuated by centrifugal weights or electromagnetic devices, such as relays. Thus, there is a need for a starting arrangement wherein an induction motor can be effectively started by means of static devices that do not require moving parts or electrical contacts that are subject to wear.

Accordingly, it is a general object of my invention to provide an improved starting arrangement for an induction motor.

A more specific object of my invention is to provide an improved starting arrangement for starting and operating an induction motor whereby the need for components having moving parts such as centrifugal weights, switches and relays is eliminated.

It is another object of the invention to provide an improved induction motor wherein a phase splitting means is connected and disconnected from a power source by static devices.

In one form of my invention a single phase induction motor is provided with a main primary winding having a portion thereof inductively coupled on a magnetic core with a pair of secondary windings. A pair of controlled rectifiers are connected in inverse parallel circuit relation and in circuit with a phase splitting means. The secondary windings are coupled to the gates of the controlled rectifiers. During the starting condition of the motor, the main winding current is relatively high and the magnetic core saturates to produce firing pulses in the secondary windings because of the rapid flux change before the magentic core saturates. A controlled rectifier is fired in each half cycle thereby energizing the phase splitting means. As the motor reaches its operating speed, the main winding current decreases, and the magnetic core unsaturates. When the magnetic core unsaturates, no firing pulses are supplied to the gates of the controlled rectifiers. Thus, during the running condition of the motor the controlled rectifiers block the current supplied to the phase splitting means thereby in effect disconnecting it from the power source.

My invention is set forth in the appended claims. The invention itself, however, together with further objects and advantages thereof, may be understood by referring to the following description taken in connection with the accompanying drawings in which:

FIGURE 1 is a schematic circuit diagram of a motor embodying one form of my invention;

FIGURE 2 is a front view of a stator corresponding to the single phase induction motor shown schematically in FIGURE 1; and FIGURE 3 is a fragmentary view in perspective of the stator shown in FIGURE 2 showing the saturable magnetic core disposed on the main primary winding in accordance with the invention.

Referring now more specifically to FIGURE 1, there is shown a schematic circuit diagram of a capacitor type of single phase motor, generally identified by reference numeral 10. A slotted rotor 11 is provided with a short circuited secondary winding 12, preferably of the squirrel cage type. The induction motor 10 includes a main primary winding 13 and an auxiliary or starting winding 14, which is physically displaced from the main winding 13, preferably by 90 electrical degrees. It will be noted that the starting winding 14 is connected in series circuit with a starting capacitor 15 across a pair of input terminal leads 16, 17 which are provided for connection to a suitable single phase alternating current supply (not shown). If desired, the starting winding 14 and starting capacitor 15 may be connected by separate electrical leads to the power source.

According to one form of my invention, I have connected a pair of silicon controlled rectifiers 18, 19 in inverse parallel relation with each other and in circuit with the starting winding 14 so that when the controlled rectifiers 18, 19 are in a blocking state, no current is supplied to the starting winding 14 or the starting capacitor 15.

The controlled rectifiers 18, 19 used in the illustrative embodiment of the invention were PNPN silicon controlled rectifiers, each having three terminals, an anode represented by the arrow symbol, a cathode represented by a line drawn through the apex of the arrow symbol and a gate represented by a diagonal line extending from the cathode. The operating characteristics of a silicon controlled rectifier are such that it conducts in a forward direction with a forward characteristic very similar to that of an ordinary rectifier when a gate signal is applied. Thus, when a positive voltage is applied to the outside P-layer and a negative voltage is applied to the outside N-layer, the two outside junctions are biased in a forward direction while the inner junction is reversely biased. Current does not flow through the controlled rectifier under these conditions, except for a small leakage current. When the applied voltage is increased to the breakover voltage of the controlled rectifier, the current gain of the device increases to unity at which time the current through the controlled rectifier increases suddenly and becomes a function of the applied voltage and of the load impedance. Hence, a small current pulse supplied to the gate lead can be used to fire the controlled rectifier since the current supplied to the gate lowers the breakover voltage.

Continuing with the description of the schematic circuit diagram shown in FIGURE 1, controlled rectifiers 18, 19 are triggered by a firing circuit means which includes a magnetic core 21, preferably a saturable magnetic core, on which a portion of the primary winding 13 and a pair of secondary windings 22, 23 are inductively coupled. As is shown in FIGURE 3, the magnetic core 21 is preferably provided with an air gap 30 which is adjusted so that the magnetic core 21 will be saturated during the starting condition of the induction motor 10 when an appreciable amount of current flows through the main primary winding 13. The secondary windings 22, 23 disposed on the magnetic core 21 provide direct current isolation and alternating current coupling with the gates of controlled rectifiers 18, 19. The resistors 24, 25 connected in circuit with the gates of controlled rectifiers 18, 19 are provided in order to limit the gate signal to the rated value for the particular controlled rectifier employed.

Referring again to FIGURE 1, the firing pulses for controlled rectfiers 18, 19 are provided by the voltage induced in the secondary windings 22, 23. Preferably, the saturable magnetic core or saturable core reactor 21 is formed of magnetic material. Before the magnetic core 21, on which the main winding 13 and the secondary windings 22, 23 are coupled, saturates, a rapid flux change takes place causing a voltage to be induced in the secondary windings 22, 23 which is sufficient to fire controlled rectifiers 18, 19. It was found that by properly adjusting the air gap 30 (see FIG. 3), the magnetic core 21 can be made to saturate during the starting condition of the motor 10 and to unsaturate during the operating condition or when the motor 10 reaches a predetermined speed.

From the foregoing description it will be seen that a completely static arrangement is provided for cutting out a starting winding and starting capacitor or other phase splitting means after the motor reaches is running speed. The starting arrangement in accordance with the invention does not require any moving parts such as centrifugally actuated switches or electromagnetic relays.

Although the phase splitting means used in the illustrative embodiment of the invention was a starting winding and capacitor, it will be understood that other phase splitting means may be used. For example, a resistor may be used in place of the starting capacitor 15 to provide a field that is out of phase with the main field of the motor 10 in order to bring the rotor 11 up to speed.

A firing circuit employing the hereinafter described circuit components was constructed and successfully started and operated a single phase induction motor. The following circuit constants of the principal components of the firing circuit are given by way of example and are not intended to limit the invention in any way:

Silicon controlled rectifiers 18,
19_____ C35B General Electric.
Secondary windings 22, 23_____ 20 turns of wire each.
Magnetic core 21_____ A wound core having a cross-sectional area ⅛ of a square inch and an air gap of approximately 10 mils.
Resistors 24, 25_____ 100 ohms.

Referring now to FIGURE 2, I have illustrated therein a stator member 26 formed of slotted laminations 27. The main primary winding 13 is disposed in slots 28 formed in the stator laminations 27 and is wound in a conventional four pole arrangement. The starting winding 14 is similarly wound in a four pole arrangement and is displaced 90 electrical degrees from the main primary winding 13. As shown in FIGURE 2, the magnetic core 21 is disposed on the end turns of the primary winding 13 and in electromagnetic relation therewith.

Referring to the fragmentary perspective view of FIGURE 3, the magnetic core 21 is a wound core formed of a continuous strip of magnetic material cut to provide the air gaps 30. A coil 29 is mounted on the magnetic core 21 and is inductively coupled thereon with the primary winding 13. Included in coil 29 are the secondary windings 22, 23, which are insulated from the magnetic core 21. Electrical leads 31, 32, 33, 34 are intended for connection with the controlled rectifiers 18, 19 as shown in the schematic circuit diagram of FIGURE 1. The controlled rectifiers 18, 19 may be mounted in any suitable location on the motor or away from the motor as may be desired in a particular application.

Having reference to the schematic circuit diagram of FIGURE 1, the operation of the motor starting arrangement will now be more fully described. The motor 10 is energized by connecting the motor input terminal leads 16, 17 in circuit with a single phase alternating current supply (not shown). During the starting condition of the motor 10, the current in the main primary winding 13 is relatively high. The leakage flux produced by this current flow in the end turns of the primary winding 13 is sufficient to saturate the magnetic core 21. The voltage induced across the secondary windings 22, 23 is now sufficient in magnitude to fire the controlled rectifiers 18, 19, one of the controlled rectifiers being fired in the positive half of the alternating current supply and the other rectifier being fired in a negative half cycle. Thus, the starting winding 14 and the starting capacitor 15 are energized during the starting condition and a resultant rotating field is produced which is out of phase with the main field, thereby causing the rotor 11 to rotate.

As the motor reaches its predetermined running speed, the main winding current decreases appreciably and the magnetic core 21 desaturates and the voltage across the secondary windings 22, 23 is insufficient to fire the controlled rectifiers 18, 19. Consequently, the controlled rectifiers 18, 19 are in a nonconducting state and will block current to the starting winding 14 and starting capacitor 15. Thus, the phase splitting means comprised of the starting winding 14 and starting capacitor 15 is, in effect, disconnected from the electrical circuit when the motor 10 reaches its operating speed.

From the foregoing description of the starting arrangement and its mode of operation, it will be apparent that it is possible to effectively disconnect a phase splitting means, such as a starting winding and a capacitor, in an induction motor without need for any moving parts that eventually wear out and cause a motor failure. It is apparent that the advantages of the present invention are obtainable in a motor starting arrangement wherein a phase splitting means must be cut off from the power source when the motor reaches a predetermined speed.

Although I have described my invention in connection with a specific embodiment thereof, it will be appreciated that many modifications may be made, as for example in the starting circuit arrangement. However, it is intended by the appended claims to cover al such moldifications that fall within the true spirit and scope of my invention.

What I claim as new and desire to secure by Letters Patent of the United States is:

1. In a single phase induction motor having a stator member, a main primary winding disposed in said stator member and including end turns extending therefrom, a starting winding physically displaced from said main primary winding, a pair of controlled rectifiers connected in inverse parallel relation, each of said controlled rectifiers having a gate, a cathode and anode, circuit means connecting said controlled rectifiers in series circuit with said starting winding and including electrical leads for connecting said controlled rectifiers and starting winding in circuit with a power source, a secondary winding connected in circuit with the gate and cathode each of said controlled rectifiers, and a saturable magnetic core, said secondary windings and at least some of the end turns of said main primary winding being inductively coupled on said saturable magnetic core by the leakage flux of said end turns, said leakage flux in said end turns being sufficient during the starting condition to saturate said magnetic core and thereby cause firing pulses to be induced in said secondary windings to fire one of said controlled rectifiers during each alternation of the power supply, and said leakage flux being insufficient to saturate said saturable magnetic core when the running condition of the motor is reached and said controlled rectifiers thereby being in a blocking state and cutting off the power supply to said starting winding.

2. In a single phase induction motor, a main primary winding, a starting winding physically displaced from said main primary winding, a pair of controlled rectifiers connected in inverse parallel relation, each of said controlled rectifiers having an anode, a cathode and a gate, a pair of input terminal leads for connection in circuit with a power source, said primary winding being connected in circuit with said input terminal leads, circuit means connecting said controlled rectifiers in series circuit relation with said starting winding and including electrical leads for connecting said controlled rectifiers and starting winding in circuit with the power source, a pair of secondary windings, a saturable magnetic core, said secondary windings being inductively coupled with said primary winding on said saturable magnetic core, and circuit means connecting one of said secondary windings in circuit with the gate and cathode of one of said controlled rectifiers and connecting the other of said secondary windings in circuit with the gate and cathode of the other of said controlled rectifiers, said controlled rectifiers being alternately triggered into a conducting state during the starting condition of said motor to energize said starting winding and reverting to a blocking state during the running condition of the motor to cut off said starting winding from said power source.

3. A single phase induction motor comprising a stator member, a main primary winding, at least a pair of electrical leads for connection with a power source, a starting winding physically displaced on said stator member from said primary winding, a semiconductor switching means, circuit means connecting said semiconductor switching means and said starting winding in series circuit relation and including electrical leads for connecting said semiconductor switching means and said starting winding in circuit with a power source, and firing circuit means including a saturable magnetic core disposed in electromagnetic relation with said main primary winding, said firing circuit means including at least one secondary winding inductively coupled with said main primary winding on said saturable magnetic core, said firing circuit means being connected in circuit with said semiconductor switching means, and said semiconductor switching means allowing current to flow to said starting winding during the starting condition of the said motor and blocking current to said starting winding during the running condition of said motor.

4. A single phase motor comprising a stator member having a main primary winding and a starting winding, a squirrel cage rotor member rotatably associated with said stator member, semiconductor switching means, starting winding, circuit means connecting said starting winding and said semiconductor switching means in series circuit relation and including electrical leads for connection in circuit with a power source, and firing circuit means connected in circuit with said switching means and including a saturable magnetic core, said saturable magnetic core being disposed in electromagnetic relation with said main primary winding and said firing circuit means including at least one secondary winding, said secondary winding being inductively coupled with said main primary winding on said magnetic core, and said firing circuit means causing said semiconductor switching means to allow current to flow to said starting winding during the starting condition of the motor and blocking current flow during the running condition of said motor.

5. A single phase motor comprising a stator member having at least a main primary winding, rotor member rotatably associated with said stator member, a semiconductor switching means capable of being switched from a blocking state to a conducting state by firing pulse, phase splitting means including a starting winding for providing a starting torque for said rotor member and circuit means connecting said semiconductor switching means and phase splitting means in series circuit relation and including electrical leads for connecting said switching and phase splitting means in circuit with a power source, firing circuit means connected in circuit with said switching means to provide firing pulses thereto whereby current flows to said phase splitting means during the starting condition of said motor and current flow is blocked after said motor reaches a predetermined speed, said firing circuit means including a saturable magnetic core and at least one secondary winding disposed thereon and said saturable magnetic core being disposed in electromagnetic relation with said primary winding.

6. A single phase induction motor comprising a stator member, a primary winding wound thereon, a squirrel cage rotor member rotatably associated with said stator member, a phase splitting means including a starting winding for providing a starting torque for said rotor member, a pair of controlled rectifiers connected in inverse parallel relation, each of said rectifiers having an anode, a cathode and gate, circuit means connecting said controlled rectifiers in series circuit relation with said phase splitting means and including electrical leads for connecting said controlled rectifiers and said phase splitting means in circuit with a power source, and firing circuit means including a pair of secondary windings, a saturable magnetic core and electrical leads connecting one of said secondary windings in circuit with the gate and cathode of one of said controlled rectifiers and connecting the other of said secondary windings in circuit with the gate and cathode of the other of said controlled rectifiers, said secondary windings being inductively coupled with said primary winding on said magnetic core, and said controlled rectifiers being alternately fired by a signal induced in said secondary windings during the starting condition of said motor to energize said phase splitting means and being in a blocking state during the running condition to cut off said phase splitting means from the power source.

7. In a single phase induction motor having a main primary winding and a starting winding physically displaced from said main primary winding, a starting capacitor connected in series circuit relation with the starting winding, a pair of controlled rectifiers connected in inverse parallel relation, each of said controlled rectifiers having an anode, a cathode and a gate, circuit means connecting said controlled rectifiers in circuit with said starting winding and capacitor and including electrical leads for connecting said controlled rectifiers, said starting winding, and said starting capacitor in circuit with a power source and in parallel with said main primary winding, and firing circuit means including a magnetic core, a pair of secondary windings disposed on said magnetic core and electrical leads connecting one of said pair of secondary windings in circuit with the gate and cathode of one of said controlled rectifiers and connecting the other of said secondary windings in circuit with the gate and cathode of the other of said controlled rectifiers, said secondary windings being inductively coupled with said main primary winding on said magnetic core, and said controlled rectifiers being triggered into a conducting state to energize said starting winding during the starting condition of said motor.

8. In a single phase induction motor having a main primary winding and a starting winding physically displaced from said main primary winding, and a starting capacitor connected in series circuit relation with said starting winding, a pair of controlled rectifiers connected in inverse parallel relation, each of said controlled rectifiers having an anode, a cathode and a gate, a pair of input terminal leads for connection in circuit with a power source, said primary winding being connected in circuit with said input terminal leads, circuit means connecting said controlled rectifiers, said starting winding and said starting capacitor in series circuit relation, said circuit means including electrical leads for connecting said controlled rectifiers, said capacitor and starting winding in circuit with the power source, a pair of secondary windings, a magnetic core, said secondary windings being inductively coupled with a portion of the main primary winding on said magnetic core, a first firing circuit means connecting one of said secondary windings in circuit with the gate and cathode of one of said controlled rectifiers, a second firing circuit means connecting the other of said secondary windings in circuit with the gate and cathode of the other of said controlled rectifier, and said first and second firing circuit means alternately firing said controlled rectifiers to energize said starting winding and capacitor during the starting condition of said motor and blocking current flow to said starting winding and capacitor during the running condition of said motor.

References Cited in the file of this patent
UNITED STATES PATENTS

| | | |
|---|---|---|
| 2,646,537 | Lewus | July 21, 1953 |
| 2,646,538 | Lewus | July 21, 1953 |
| 2,727,197 | Lewus | Dec. 13, 1955 |
| 2,929,978 | Petrocelli | Mar. 22, 1960 |